United States Patent [19]

Murkens

[11] Patent Number: 4,680,869

[45] Date of Patent: Jul. 21, 1987

[54] CYLINDRICAL SQUARE

[76] Inventor: David Murkens, 724 Park Ave., Meadville, Pa. 16335

[21] Appl. No.: 899,805

[22] Filed: Aug. 25, 1986

Related U.S. Application Data

[63] Continuation-in-part of Ser. No. 732,922, May 13, 1985, abandoned.

[51] Int. Cl.⁴ ................................................. G01B 5/24
[52] U.S. Cl. ........................................ 33/533; 33/535; 33/567; 33/DIG. 1
[58] Field of Search ........... 33/535, 533, 567, DIG. 1, 33/169 C, 172 D, 168 R

[56] References Cited

U.S. PATENT DOCUMENTS

| | | | |
|---|---|---|---|
| 1,778,481 | 10/1930 | Boucher | 33/DIG. 1 X |
| 2,971,261 | 2/1961 | Michie | 33/429 |
| 3,711,929 | 1/1973 | Blakey et al. | 33/567 X |

FOREIGN PATENT DOCUMENTS 792869  4/1956 United Kingdom ................ 33/535

*Primary Examiner*—Harry N. Haroian
*Attorney, Agent, or Firm*—Charles L. Lovercheck; Wayne L. Lovercheck; Dale R. Lovercheck

[57] ABSTRACT

A cylindrical square for inspecting the angular relationship of a test surface to a vertical support surface on a vertical support member. The flat surface being intended to be perpendicular to the test surface, a dial indicator having a sensing member and a supporting member supported on said support surface. Said dial indicator support being adapted to have a dial indicated thereon to be slid along the top of said cylindrical surface of said cylindrical square whereby the dial indicator will indicate errors in the angular relationship of the vertical surface to the flat test surface.

2 Claims, 5 Drawing Figures

CYLINDRICAL SQUARE

REFERENCE TO PRIOR APPLICATION

This is a continuation-in-part of application Ser. No. 732,922, filed May 13, 1985, now abandoned.

BACKGROUND OF THE INVENTION

Prior to the invention disclosed herein, gauges for testing the accuracy of the relationship of a vertical and horizontal surface were comprised of a gauge with an enlarged integral end part supporting the cylindrical test surface to the surface to be tested by a permanent magnet and a magnet that itself engages the steel surface of a plate.

STATEMENT OF THE INVENTION

The device disclosed herein is made up of a precision ground cylinder having ends disposed at right angles to the cylindrical surface and a permanent magnet inserted in the cylinder. The magnet is a few thousandths of an inch from the end of the hollow cylinder so that particles adhering to the magnet will not destroy the accuracy of the cylindrical square. Not only is this square ended cylinder simpler to manufacture than the prior devices, but it is easier to use and the gauging surface extends over the entire length of the gauge thereby giving considerably greater accuracy of measurement due to the cylindrical configuration which continues from end to end and therefore the surface from end to end of the gauge can be used as a surface for the dial indicator sensing element.

OBJECTS OF THE INVENTION

It is an object of the invention to provide an improved testing gauge for testing the accuracy of the angular relationship between two angularly related surfaces.

Another object of the invention is to provide a simple cylindrical shaped gauge having flat ends disposed at right angles to the cylindrical surface and a permanent magnet embedded in one end for use as a gauge.

Another object of the invention is to provide a cylindrical square that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWINGS

Figure 1:
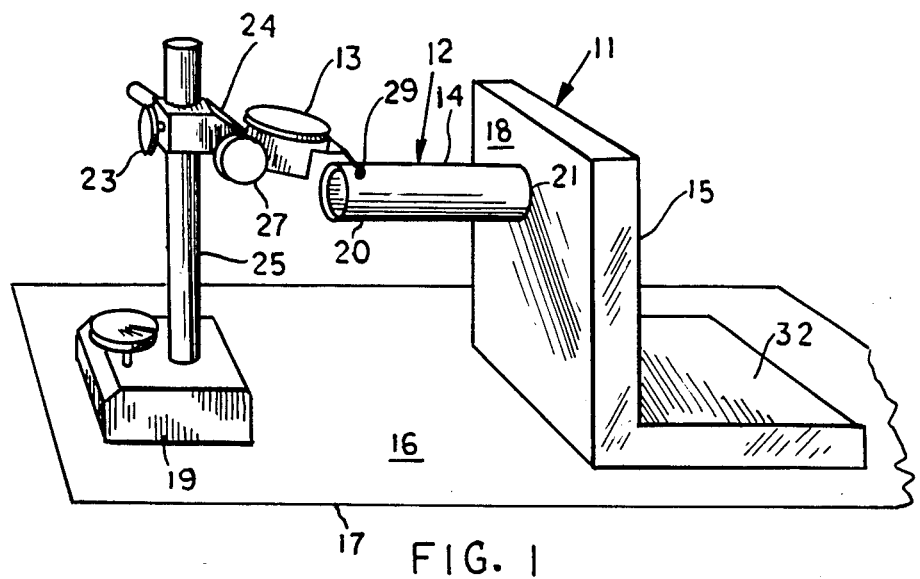
FIG. 1 is an isometric view of the cylindrical square gauge supported on a vertical surface, the accuracy of which is to be tested in relation to a horizontal surface with the dial indicator shown in operative position.
Figure 2:
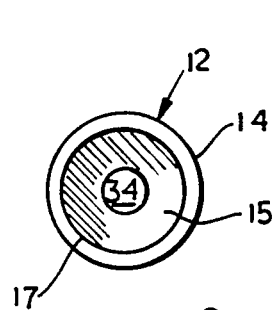
FIG. 2 is an end view of the gauge shown in FIG. 3.
Figure 3:
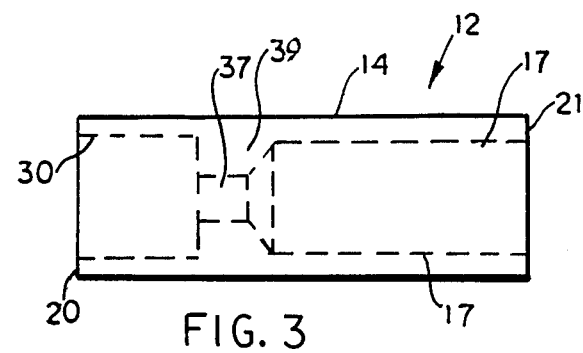
FIG. 3 is a side view of the cylindrical square gauge according to the invention.
Figure 4:
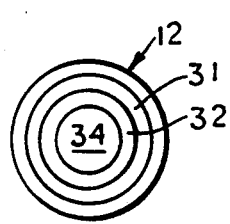
FIG. 4 is an end view of the magnet end of the cylindrical square.
Figure 5:
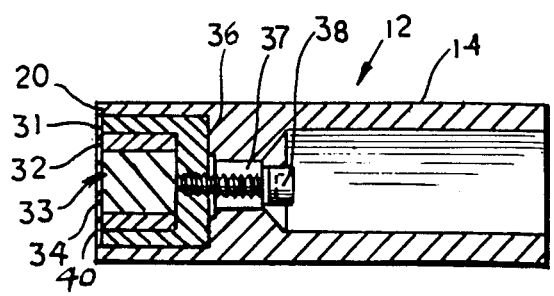
FIG. 5 is a longitudinal cross sectional view of the cylindrical square gauge.

Now with more particular reference to the drawings, I show a gauge support 11 having a vertical surface 18.

The purpose of the hollow cylindrical square 12 is to check the accuracy of the right angle between surface 18 and surface plate 17. The gauge support 11 has a horizontal part 32 and a vertical part 15 with vertical surface 18 on the vertical part 15. The gauge support 11 is of a type familar to those skilled in the art. The indicator support 25 is supported on horizontal surface 16 of surface plate 17. Support plate 17 may be a conventional surface plate of a type familiar to those skilled in the art.

The cylindrical square 12 may be one inch in diameter. This allows for a slower rise and fall of the needle than smaller diameters and therefore makes it easier to get an accurate indicator reading.

The cylindrical square 12 is held in place on vertical surface 18 by means of permanent magnets 34. The permanent magnet assembly 33 is inserted in the end 21 of the cylindrical square 12. The indicator support 25 has a support surface 19 adapted to rest on the horizontal surface 16. The cylindrical square 12 has a cylindrical surface 14 extending from end to end. The end surfaces 21 of cylindrical square 12 are perpendicular to the cylindrical surface 14. The permanent magnet assembly 33 is in bore 30. The magnet in the end of the cylindrical square 12 is adapted to hold the cylindrical square 12 to the gauge support 11 in square relationship to the surface 18 of the surface plate 17.

The permanent magnet assembly 33 is made up of a first hollow cylindrical member 31 having a first end and a second closed end 36, a second hollow cylindrical member 32 having a first end and a second end and permanent central magnet 34 having a first end and a second end. Second hollow cylindrical member 32 is received in first hollow cylindrical member 31 and central permanent magnet 34 is received in the second hollow cylindrical member 32.

The first ends of the first hollow cylindrical member 31, magnetic second hollow cylindrical member 32 and the central permanent magnet 34 are all flush with each other and spaced inwardly from the end 21 of the body of cylindrical square 12, thereby providing a gap between the end of the magnetic assembly 33 and the end 20 of the cylindrical square 12, so that dirt particles can be received against the end of the magnetic assembly 33, and not come in contact with vertical surface 18, and thereby interfere with the accuracy of the gauge.

Cylindrical surface 14 has a partition 39 with a central hole 37 formed in it. Screw 38 extends through central hole 37 into the threaded hole 41 in the closed end 36 of the magnetic assembly 33, thereby holding the magnetic assembly in place.

To test the accuracy of the vertical surface 18 to the horizontal surface 16, the cylindrical square 12 is magnetically supported on the vertical surface 18. To operate the device, the indicator 13, which is of a type familiar to those skilled in the art, is attached to indicator support 25. The indicator 13 is vertically adjustable by means of the hand wheel 23, which locks the position of the bracket 24 on the indicator support 25. The angular position of the indicator 13 to the indicator support 25 is controlled by the hand wheel lock 27 to align the incline of the dial indicating sensing member 29 to the proper position with the cylindrical surface 14. The indicator support 25 is slid over the horizontal surface 16 toward the gauge support 11 and as the dial indicator sensing member 29 engages and slides along the top of the cylindrical surface 14 the indicator 13 shows whether the top of cylindrical square 12 is parallel to vertical surface 18. The dial indicator is set at zero.

Any variation of the cylindrical surface 14 of the top of cylindrical square from the horizontal will indicate a corresponding variance of the angle between the horizontal surface 16 and the vertical surface 18.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a cylindrical gauge and a horizontal surface to be checked by said cylindrical gauge and a gauge support,
   said cylindrical gauge having a cylindrical hollow gauge body having a partition therein with a central hole through said partition having a first precision flat end and a second end,
   said cylindrical gauge body having a precision cylindrical outside surface perpendicular to said first end surface extending from said first end to said second end,
   said gauge support having a vertical surface and a horizontal surface,
   an indicator support having a flat horizontal surface and a sensing element,
   said indicator support being adapted to have its said flat surface rest on said horizontal surface,
   said gauge support being made of magnetic material,
   said cylindrical gauge having a cylindrical permanent magnet means in said hollow gauge body adjacent said first end,
   said permanent magnet means comprising a first hollow cylinder made of magnetic material having a first end and a second end,
   a second hollow cylinder made of non-magnetic material having a first end and a second end,
   a cylindrical permanent magnet having a first end and a second end,
   said hollow cylindrical gauge body, said first hollow cylinder, said second hollow cylinder, and said permanent magnet being disposed concentric to each other,
   said first hollow cylinder receiving said second hollow cylinder,
   said second hollow cylinder receiving said cylindrical permanent magnet,
   said first end of said first hollow cylinder, said first end of said second hollow cylinder and a said end of said permanent magnet being disposed in a common plane,
   said common plane being spaced inward of said first end of said cylindrical gauge body,
   a screw extending through said central hole in said partition,
   means on said second end of said permanent magnet means engaging said screw whereby said magnet means is held rigidly to said partition,
   holding said permanent magnet means in spaced inwardly relation to a plane disposed on said first precision flat end of said cylindrical gauge body providing a space for foreign material to be received between said first end of said permanent magnet means and said vertical surface of said gauge support,
   said cylindrical outside surface being adapted to be held parallel to said horizontal surface by said permanent magnet means,
   said indicator support being adapted to be moved over said horizontal surface with said indicator sensing element in contact with the upper edge of said precision cylindrical outside surface whereby the accuracy of said angle between said horizontal surface and said vertical surface is checked by said indicator.

2. A cylindrical square comprising a hollow body having a first end, a second end and a precision cylindrical outside surface,
   said first end being a relatively thin annular precision flat end surface perpendicular to said precision cylindrical surface,
   a partition in said hollow body between said first end and said second end,
   a central hole in said partition,
   a screw extending through said hole,
   a cylindrical permanent magnet means,
   a first hollow cylinder having a closed end and an open end and made of magnetic material,
   a second hollow cylinder being made of non-magnetic material received in said first hollow cylinder and having an open end,
   said second hollow cylinder receiving said cylindrical permanent magnet with said permanent magnet having an end generally flush with said open end of said first hollow cylinder and said open end of said second hollow cylinder forming an end of said magnetic means,
   said screw engaging said permanent magnet means holding said permanent magnet means against said partition with said end of said permanent magnet means in spaced relation to said first end of said hollow body,
   said permanent magnet means being adapted to hold said relatively thin annular surface to said cylindrical square to a vertical surface providing a space for particles of foreign material between said permanent magnet means and said vertical surface,
   said cylindrical surface being adapted to have a dial indicator sensing member supported on a horizontal surface slid along the precision cylindrical outside surface, along the entire length of said cylinder, whereby the accuracy of the vertical surface to the horizontal surface is indicated.

* * * * *